United States Patent [19]

Yamamoto et al.

[11] 4,232,219
[45] Nov. 4, 1980

[54] PHOTOSENSOR

[75] Inventors: Hideaki Yamamoto, Hachioki; Toshihisa Tsukada, Sekimachi; Eiichi Maruyama, Kodaira; Hiroya Inagaki, Sekimachi, all of Japan

[73] Assignees: Nippon Telegraph and Telephone Public Corporation; Hitachi, Ltd., both of Japan

[21] Appl. No.: 15,615

[22] Filed: Feb. 27, 1979

[30] Foreign Application Priority Data

Mar. 3, 1978 [JP] Japan ................................. 53/23461

[51] Int. Cl.³ .............................................. G02B 5/14
[52] U.S. Cl. .................................... 250/227; 250/226; 235/473
[58] Field of Search ....................... 250/227, 551, 226; 235/473

[56] References Cited

U.S. PATENT DOCUMENTS 3,786,238  1/1974  Heisner .................... 250/227

Primary Examiner—David C. Nelms
Assistant Examiner—Darwin R. Hostetter
Attorney, Agent, or Firm—Craig & Antonelli

[57] ABSTRACT

A photosensor including a fiber substrate having a light receiving window formed in a surface thereof spaced from an information surface to be read, a bundle of optical fibers disposed in the fiber substrate and positioned in the light receiving window. A plurality of color filters of different characteristics are disposed on an end face of the bundle of optical fibers, and a plurality of arrays of photosensitive elements corresponding to the color filters are also provided. The arrays of photosensitive elements are integrally provided with the fiber substrate and disposed in the region of the end face of the bundle of the optical fibers farthest away from the information surface.

14 Claims, 18 Drawing Figures

FIG. 1 PRIOR ART
FIG. 2a
FIG. 2b
FIG. 3a
FIG. 3b
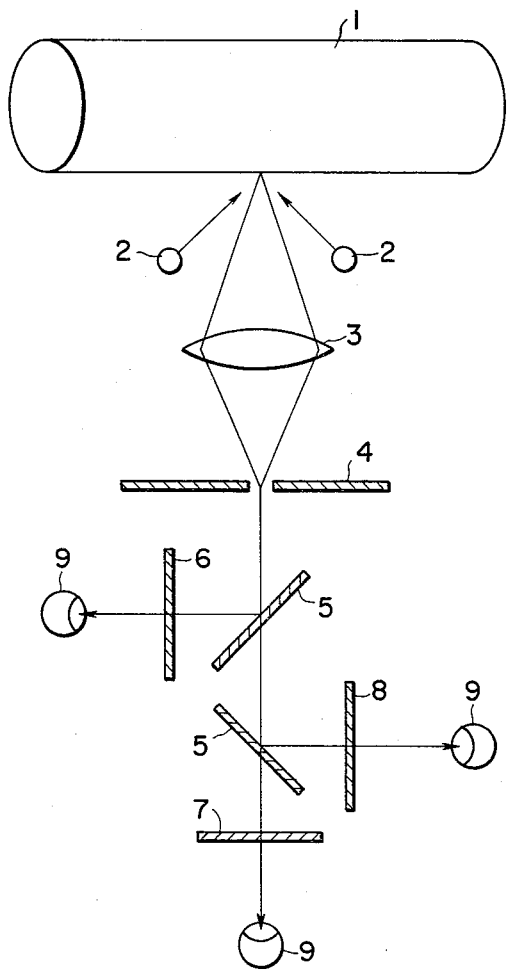
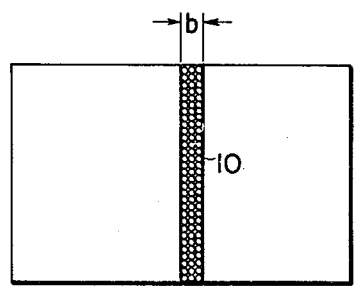
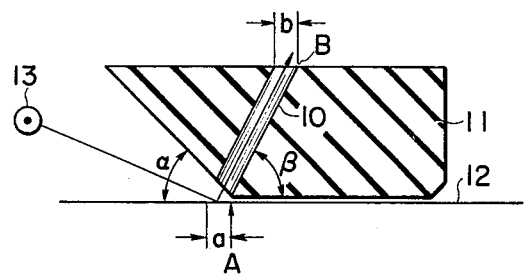
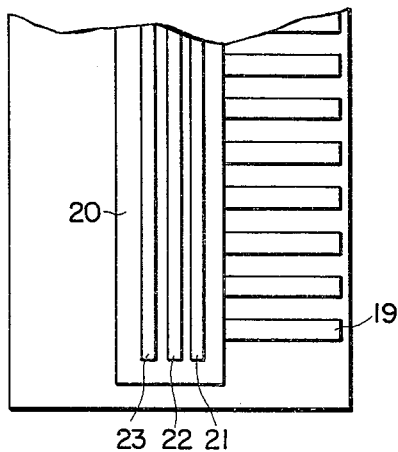
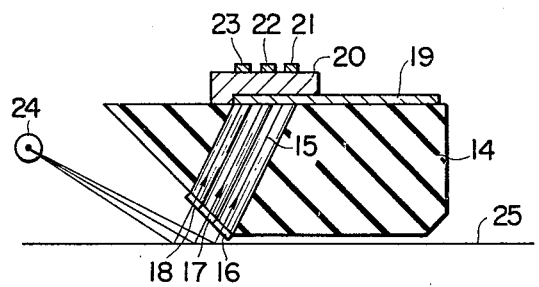

PHOTOSENSOR

BACKGROUND OF THE INVENTION

1. Field of the Invention

The present invention relates to a photosensor and, more particularly, to a photosensor suitable for use in color facsimile equipment, an optical character recognition device, a color decomposing device and the like.

2. Description of the Prior Art

FIG. 1 shows schematically a photosensor of a conventional color facsimile transmitter, including a manuscript drum 1, light source lamps 2, a lens 3, a slit 4 and dichroic mirrors 5. The transmitter also includes a red filter 6, a green filter 7 and a blue filter 8 with a photomultiplier being indicated by reference numeral 9. The light emitted from the light source lamp 2 is reflected by the manuscript which is wound around the drum 1, and is focussed by the lens 3. The light then passes through the slit 4, and is decomposed into three elementary colors of red, green and blue, by means of two dichroic mirrors 5 and three color filters 6, 7 and 8. These are converted into electric signals by the photomultiplier 9, and are read electrically. The scanning is effected by mechanically rotating the manuscript drum 1, while continuously mechanically shifting the optical system 2-9.

The requirements for a color facsimile transmitter include reduced size and weight, as well as a shortened reading time. However, the scanning system in the conventional transmitter relying upon the mechanical shift of the optical lens system poses the following disadvantages.

1. The use of the optical lens system makes it difficult to reduce the size of the transmitter.
2. The mechanical shifting of the optical lens system is not preferred from the view point of reduction of the size of the transmitter. Also, the weight of the transmitter is increased by the shifting mechanism.
3. The mechanical scanning requires an impractically long reading time.

A novel photosensor has been proposed by at least one of the co-inventors of this application, and has been filed as copending U.S. patent application Ser. Nos. 903,161 and 918,273, filed May 5, 1978 and June 22, 1978, respectively. This photosensor has a sheet-like bundle of optical fibers which extends across the thickness of a base member from a first to a second surface thereof. Rows of photosensitive elements are integrally provided with the base member and are disposed on one surface of the sheet-like optical fibers, while the other surface constitutes a surface for reading the information. This photosensor, however, cannot read color information.

It is therefore an object of the present invention to overcome the above described disadvantages of the prior art arrangements, by providing a photosensor which enables the reading of color information in a shorter reading time, without making use of an optical lens system, and which is suitable for use in a color facsimile transmitter, a character recognition device, a color decomposing device and the like, and which enables these devices to have reduced sizes.

SUMMARY OF THE INVENTION

According to the present invention, there is provided a photosensor including a substrate having a light receiving window in a surface thereof which is spaced a small distance from the information surface of an object to be read. A bundle of optical fibers is disposed in the substrate, so as to be exposed to the outside through the window and a plurality of rows of color filters of different characteristics are disposed in the light receiving window. Further, a plurality of arrays of photosensitive elements corresponding to the rows of color filters, are integrally provided with the substrate and are disposed on the other end surface of the bundle of optical fibers.

BRIEF DESCRIPTION OF THE DRAWINGS

FIG. 1 is an illustration of a conventional transmitter employing an optical lens system, FIG. 2a is a plan view of a fiber substrate, FIG. 2b is a sectional view of the fiber substrate, FIG. 3a is a plan view of a fiber substrate which constitutes the substrate of the photosensor of the present invention, FIG. 3b is a sectional view of the substrate as shown in FIG. 3a, FIGS. 4a to 4f show the steps of a process for manufacturing the photosensor.

DESCRIPTION OF THE PREFERRED EMBODIMENTS

Figure 4A:

FIGS. 2a and 2b show in plan and in sectional view, respectively, a substrate having rows of optical fibers, for use in the photosensor of the present invention. In these Figures, reference numeral 10 denotes a bundle of optical fibers which may be constituted by a number of optical fibers welded to one another to form a bundle. Reference numeral 11 designates a member which is made of a material easily weldable to the optical fibers of the bundle 10, e.g., a plurality of optical fibers welded to one another, or plates of glass or a plastic. If the member 11 is made of glass, the members 10 and 11 are welded to each other to form a substrate. In case the member 11 is made of a resin, it can be formed by bonding molding. The substrate in which optical fibers are embedded in the above-described manner will be referred to hereinafter as a "fiber substrate".

Reference numerals 12 and 13 denote a color manuscript and a light source, respectively. The left-hand side of the fiber substrate 11 is cut obliquely at an angle α, for an effective incidence of the light. The light emitted from the light source 13 is scattered by the color manuscript 12, as shown by arrows in FIG. 2b. However, only the light scattered by a width a of the manuscript around a point A comes into the optical fibers and emerges in the region of width b around a point B. It is therefore possible to read the color information around the point A of the color manuscript, by disposing photosensitive elements, such as photodiodes, which receive the light across color filters, around the point B.

For reading the color manuscript at a higher resolution, and for making a more efficient use of the light, the angle α is preferably determined as follows. If the angle α is too large, the region which can be read is limited to an extremely small width around the point A, although the amount of the incident light is increased. This is because the portion of high resolution formed around the point B is restricted to an extremely small area as the distance between the manuscript 12 and the fiber 10 is increased. This in turn requires a smaller area of the photodiodes disposed around the point B. Thus, for a higher resolution of the reading, it is necessary to reduce the area of the photodiodes disposed around the point B. This is not preferred because the signal current becomes impractically small. On the other hand, if the angle α is too small, the region readable at a high resolution becomes larger, but the amount of incident light is reduced. The optimum angle α is therefore determined taking into account the amount of incident light, light receiving area of photodiodes and the required resolution. From a practical point of view, this angle α is selected to fall within the range of between 20° and 50°.

Referring to FIG. 2b, the optical fibers are embedded at an angle β to the plane of the fiber substrate. If this angle β is selected too small, not only the light scattered by the portion of the manuscript of interest, i.e. the signal component of the light, but also the light scattered by other portions of the manuscript, i.e. the noise component, is received so as to unfavorably reduce the S/N ratio of the signal.

A too large angle β is also not preferred, because it narrows the readable region. The angle β is therefore selected, taking into account the S/N ratio and the light-receiving area of the photodiodes. This angle β is in practice between 30° and 80°, in most cases.

The fiber substrate is cut obliquely also at its right-hand side end, so that the manuscript may be inserted smoothly from both sides of the fiber substrate.

FIGS. 3a and 3b show in plan and in section views, respectively, a photosensor having three rows of filters of red, green and blue disposed on the fiber substrate, and three rows of photosensitive elements, e.g., one-dimensional arrays of photodiodes, corresponding to respective rows of the filters.

More specifically, referring to FIGS. 3a and 3b, the fiber substrate is designated by reference numeral 14, while reference numeral 15 denotes an optical fiber portion. Reference numerals 16, 17, and 18 denote, respectively, rows of filters of green, red and blue colors. Stripe electrodes constituted by a transparent conductive film are designated by reference numeral 19, while a semiconductor film is denoted by reference numeral 20. Reference numerals 21, 22 and 23 denote, respectively, upper metal electrodes. The color filters are disposed at the lower end of the obliquely cut surface of the substrate 14, in the form of three rows which extend in the main scanning direction of the photosensor. The portions between the stripe electrodes 19 and three upper metal electrodes constitute the photodiodes. Thus, three linear arrays of photodiodes are formed. In this case, the semiconductor film 20 is used in common. However, no crosstalk between the linear arrays of photodiodes takes place, if the commonly used semiconductor film has a sufficiently high resistance in the transverse direction. More specifically, a specific resistance of about $10^8 \Omega$ cm or higher is acceptable in practice, provided that the semiconductor film has a thickness of 2 μm and a dielectric constant of 6, and that the width and pitch of the stripe electrode are 200 μm and 250 μm, respectively. It is possible to increase the specific resistance of the semiconductor film up to $10^{14} \Omega$ cm or so.

The light emitted from a light source 24 is scattered by a color manuscript 25 and the scattered light is color-decomposed by three color filters as shown in FIG. 3b, and each color component gets into corresponding array of photodiode, so as to be photoelectrically converted independently. In case that the resolution is 6/mm, the light-receiving area of each photodiode is as large as 120 μm × 120 μm. Therefore, by selecting the diameter of each optical fiber constituting the fiber portion 15 to be 20 μm or so, the photodiodes can be formed corresponding to the positions of the color filters, and it is not necessary to take the step of aligning the photodiodes with the fibers.

As will be seen from FIG. 3b, the positions of reading of respective colors are offset by several hundreds of μm. This offset can be corrected, however, by effecting a similar scan in the receiver.

Heretofore, the light-receiving areas of photodiodes for respective colors have not been taken into consideration. However, it is preferred that the levels of signals from the photodiodes for red, green and blue colors are equal, when a white paper is placed as the color manuscript. The levels of the outputs from the photodiodes for respective colors are given by the following equation:

$$j_{sig} = KS[\int_n^\infty f(\lambda) \cdot P(\lambda) \cdot L(\lambda)d\lambda] \quad (1)$$

where,
$j_{sig}$: output current
K: proportional constant
S: light-receiving area of photodiode
λ: wave length
f(λ): spectral transmissivity of a color filter
P(λ): spectral sensitivity of a photodiode
L(λ): spectral distribution of a light source As a matter of fact, generally, the value of the term in the bracket [ ] differs depending on the color. Therefore, the output signal $j_{sig}$ from the photodiodes of respective colors differ from one another. This problem, however, can generally be overcome by differentiating the light-receiving areas S of the photodiodes so as to equalize the levels of the output from respective photodiodes. This can easily be achieved by providing differing widths for the upper metal electrodes 21, 22, 23 as shown in FIG. 3b.

As will be understood from the foregoing description, it is possible to produce a photosensor which enables the reading of color manuscript at a high resolution, without using the optical lens system and the dichroic mirror, by disposing a plurality of linear arrays of photodiodes on the fiber substrate. This photosensor further allows a more efficient use of the light, because it does not include any optical lens system, so that the information can be read even with a light of smaller intensity. Further, the reading time is remarkably reduced, because the scanning is made solely by electronic means. Thus, the present invention provides a photosensor which offers various advantages.

The invention will be more fully understood from the following detailed description of preferred embodiments.

Embodiment 1

A fiber substrate of the same construction as that shown in FIGS. 2a, 2b, is used. The fiber portion has a width of 1 mm, while other portions are made of glass. The optical fibers are embedded at an angle of 75° to the surface of the substrate. The left-hand side end is cut at an angle of 40°, so as to facilitate the incidence of the light. The optical fiber used in this embodiment has a diameter of 25 μm. On this fiber substrate, formed as the photosensitive elements are three linear photodiode arrays constituted by an amorphous semiconductor of a Se-As-Te system having a specific resistance of about $10^{14} \Omega$ cm.

Figure 4B:
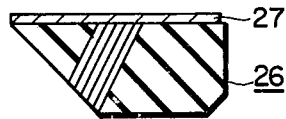
Figure 4C:
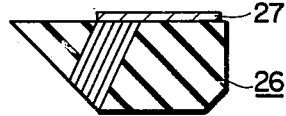

FIGS. 4a to 4f show the steps of a process for manufacturing the photosensor. In these Figures, reference number 26 denotes a fiber substrate similar to that of FIG. 2b. The surface of the fiber substrate is preferably optically polished, although the fiber substrate may be used without polishing. However, more preferably, a transparent insulating film is formed on the fiber. For instance, a film of aluminum oxide ($Al_2O_3$), quartz glass or glass is sputtering-evaporated on the fiber substrate, and is then optically polished. The glass used in this step may be E-2 glass manufactured by Ohara Optical Glass Manufacturing Co., Ltd. of Japan or #7059 glass made by Corning Co., Ltd. The thickness of the film is preferably larger than 1000 Å, although it depends on the roughness of the underlying material. The thickness of this film is limited so as to be smaller than 5 μm, and is preferably between 2 and 3 μm, because there is no advantage brought about by increasing the thickness. On the surface of this fiber substrate, a tin oxide transparent conductive film 27 of 0.1 μm thick is formed by a C.V.D. process (Chemical Vapor Deposition) making use of a gaseous mixture of $SnCl_4$ and $N_2$, as shown in FIG. 4b. Then, the substrate is subjected to a photoetching, so as to become a stripe electrode as shown in FIG. 4c. The stripes of this stripe electrode, each being 120 μm wide, are arranged at a pitch of 167 μm. Subsequently, color decomposing filters 28, 29 and 30 for green, red and blue colors are formed in the form of webs. These color filters may be gelatine filters or interference filters.

Figure 4D:
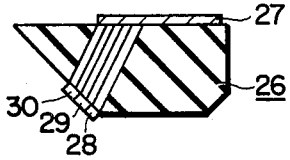
Figure 4E:
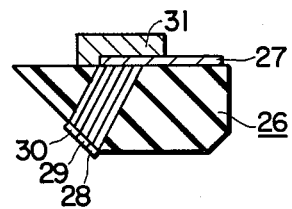
Figure 4F:
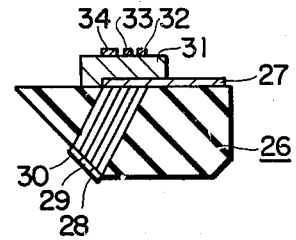

These filters can be formed by known processes. For instance, the filter can be formed by applying gelatine, if the filter is a gelatine filter. In case of an interference filter, it is formed preferably by sputtering evaporation. Then, a photoetching is effected for the shaping of the filters, as shown in FIG. 4d. The green and red filters have a width of 150 μm, while the blue filter is 300 μm wide. Thereafter, a film 31 of an amorphous semiconductor of a Se-As-Te system of 2 μm thickness is formed by a mask-evaporation on the stripe electrode, as shown in FIG. 4e. Further, three rows of upper electrodes 32, 33, 34 are formed on the film 31, by mask-evaporation, as shown in FIG. 4f. The electrodes 32 and 33 have a width of 120 μm, while the electrode 34 has a width of 240 μm. The portion between the stripe electrode 27 and the upper electrode 32 constitutes the linear photodiode array for green. Similarly, the portions between the stripe electrode 27 and the upper electrode 33 and between the stripe electrode 27 and the upper electrode 34 constitute, respectively, the linear photodiode arrays for red and blue. These linear photodiode arrays will be referred to hereinafter as G-diode array, R-diode array and B-diode array.

Figure 5:
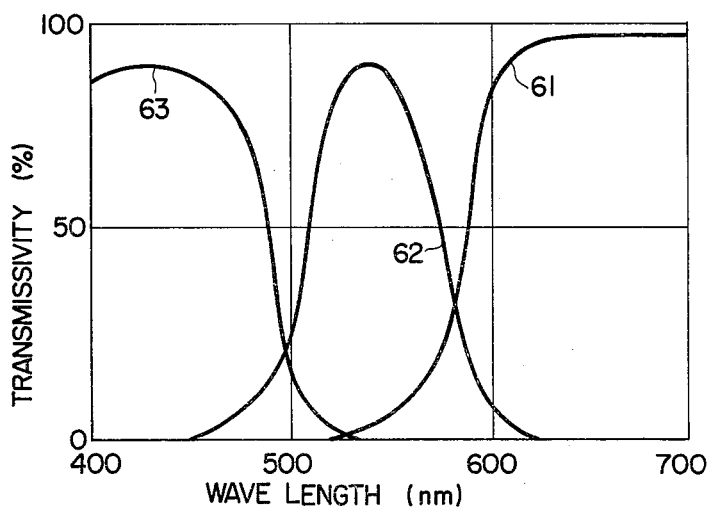
FIG. 5 shows the spectral transmissivity characteristics of color filters as used in the embodiments of the present invention.

Among the three photodiode arrays, the widths of the filter and upper electrode of B-diode array are two times as large as those of R and G-diode arrays. This arrangement is for equalizing the levels of outputs from respective photodiodes for a white material placed as the manuscript. A calculation of the equation (1) on the assumption that the light-receiving areas are equal shows that the ratio of the levels of outputs from the R, G and B photodiodes is materially 2:2:1. This means that the level of the output from the B-diode array is almost half of those of the R and G-diode arrays. Reference numerals 61, 62 and 63 in FIG. 5 denote, respectively, the characteristics of red, green and blue filters.

Figure 6:
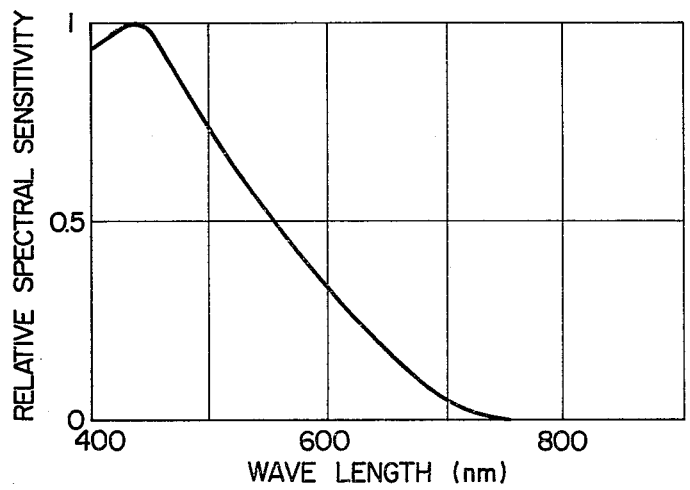
FIG. 6 shows the spectral sensitivity characteristics of a photodiode as used in the embodiments.
Figure 7:
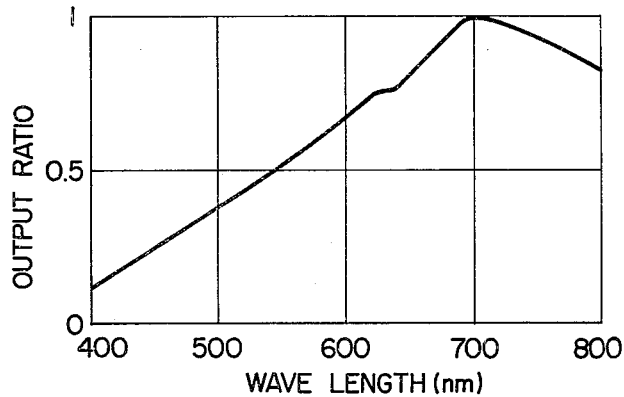
FIG. 7 shows the spectral distribution of light emitted from a tungsten lamp as used in the embodiments of the present invention.
Figure 8:
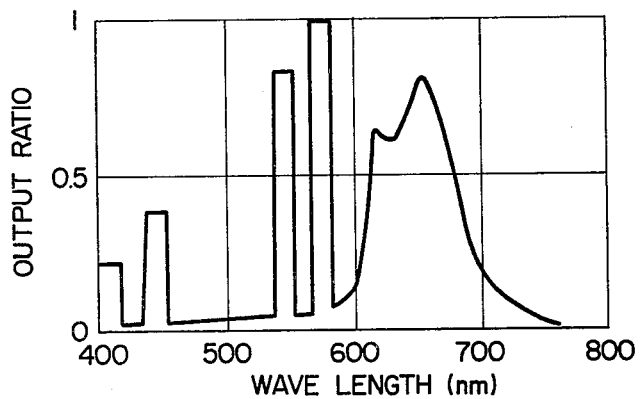
FIG. 8 shows the spectral distribution of the light emitted from a fluorescent lamp.

FIG. 6 shows the spectral sensitivity characteristic of an amorphous Se-As-Te system photodiode. A tungsten lamp having a color temperature of 3000° K. was used as the illuminating light source. The spectral distribution of this lamp is shown in FIG. 7. Thus, the levels of the outputs from R, G and B-photodiodes are equalized by selecting the light-receiving area of the B-photodiode array to be twice as large as those of other photodiode arrays. If a fluorescent lamp having a spectral distribution as shown in FIG. 8 is used as the illuminating light source, the light-receiving areas of the R, G and B-diode arrays are selected at a ratio of 2:1:1.

The luminosity factors for red, green and blue colors are 0.05, 1.0 and 0.08, respectively. Therefore, the visual resolution of the reproduced image is determined mainly by the resolution for the green color. Thus, the G-diode array is required to have the highest resolution. Therefore, it is preferred to arrange the R, G and B-diodes such that the green filter is positioned closer to the information surface than the other filters. No substantial difference is necessary between the conditions of R and G.

Figure 9A:
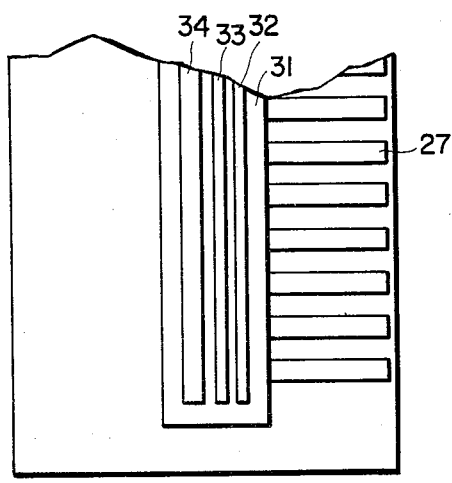
FIG. 9a is a plan view of a photosensor embodying the present invention.
Figure 9B:
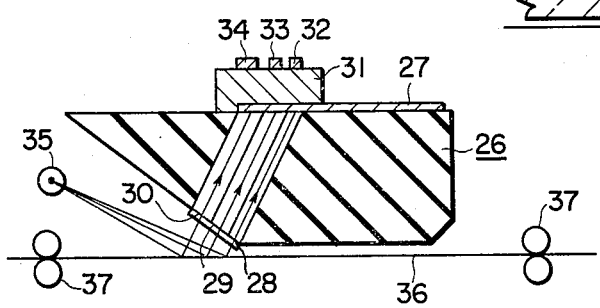
FIG. 9b is a sectional view of the photosensor as shown in FIG. 9a, and FIG. 10 is a sectional view of another photosensor in which optical fibers are embedded in the substrate perpendicularly to the substrate surface.

FIGS. 9a and 9b show in plan and in section views, respectively, the photosensor produced by the process as shown in FIGS. 4a to 4f, having R, G and B-photodiode arrays formed on the fiber substrate. This color photosensor can be used in the following manner.

Reference numerals 35, 36 and 37 denote, respectively, a tungsten lamp, a color manuscript and rollers for shifting the manuscript. The light emitted from a light source 35 is scattered by the color manuscript 36 as shown by arrows. The scattered light is decomposed by the decomposing filters 28, 29 and 30 into green, red and blue components. These components are introduced into respective photodiodes, so as to be changed into readable electric signals.

Embodiment 2

In the first embodiment, the optical fibers are embedded in the fiber substrate at an inclination to the surface thereof. However, the optical fibers may alternatively be embedded so as to extend at a right angle to the substrate, as will be understood from the following description.

Figure 10:
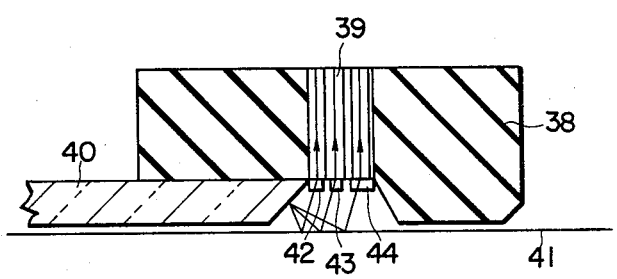

Referring to FIG. 10, a plate 38 is made of a material easily bondable to the optical fiber 39, e.g. a glass plate which may be transparent or opaque. Bundles 39 of optical fibers are arrayed perpendicularly to the surface of the fiber substrate. A part of the bottom portion of this substrate is removed by a chemical etching or polishing as shown in FIG. 10. An optical guide 40 for guiding the illuminating light is placed at the removed portion of the substrate bottom. The optical guide 40 may be made of a thin glass plate, or sheet-like bundle of optical fibers. As the color-decomposing filters, a green filter 42, red filter 43 and a blue filter 44 are disposed at the bottom of the fiber substrate. These filters have widths of 150 μm, 150 μm and 300 μm, respectively. Three linear photodiode arrays are formed on the fiber substrate in the same manner as that in the first embodiment, so that the information can be read in the similar way as that of the first embodiment.

As will be understood from the foregoing description, according to the invention, it is possible to read the color manuscript at a high resolution, without employing an optical lens system and dichroic mirror, and without necessitating complicated adjustment of the mechanism. Further, the invention offers various advantages such as an increased efficiency of use of the light. Further, since the photosensor of the invention can have a large length, it can be used conveniently in color facsimile equipment.

In the above description, three linear photodiode arrays of different colors are used. This arrangement, however, is not exclusive, and it is possible to employ an arrangement in which two or four linear arrays of photodiodes for different colors are incorporated. At the same time, needless to say, it is possible to use cyan, magenta and yellow, as the colors of the color filters. It is also possible to dispose the color filters on the end face of the bundle of optical fibers positioned farthest away from the light receiving window.

We claim:

1. A photosensor comprising a fiber substrate having a light-receiving window formed in one surface thereof, the one surface being spaced from an information surface to be read, a bundle of optical fibers being disposed within said substrate and positioned within said light-receiving window, a plurality of color filters of different characteristics being disposed on an end face of said bundle of optical fibers, and a plurality of arrays of photosensitive elements corresponding to said color filters, said arrays of photosensitive elements being integrated onto said fiber substrate and disposed in the region of the end face of said bundle of optical fibers positioned farthest away from the information surface.

2. A photosensor according to claim 1, wherein said plurality of color filters includes rows of color filters of different characteristics and said plurality of arrays of photosensitive elements corresponding to said rows of color filters.

3. A photosensor according to claim 2, further comprising a transparent insulating film interposed between the end face of said bundle of optical filters and said plurality of arrays of photosensitive elements.

4. A photosensor according to claim 3, wherein said transparent insulating film has a thickness between 1000 Å and 5 μm.

5. A photosensor according to claims 1, 2, 3 or 4, wherein said plurality of color filters are of three elementary colors.

6. A photosensor according to claim 5, wherein the three elementary color filters are of red, green and blue colors and the green color filter is positioned closer to the information surface then red and blue color filters.

7. A photosensor according to claims 1, 2, 3 or 4, wherein said arrays of said photosensitive elements include a plurality of transparent stripe electrodes, a photoconductive film, and a plurality of common electrodes arranged in correspondence with said color filters and intersecting said stripe electrodes.

8. A photosensor according to claim 7, wherein at least the width of said common electrodes of respective ones of said arrays are different from the width of said common electrode of other of said arrays for adjusting the level of outputs from said arrays.

9. A photosensor according to claim 8, wherein said plurality of color filters are of three elementary colors.

10. A photosensor according to claim 9, wherein the three elementary color filters are of red, green and blue colors, and the green color filter is positioned closer to the information surface then the red and blue color filter.

11. A photosensor according to claims 1, 2, 3 or 4, wherein the one surface of said substrate having said light receiving window is inclined at an angle of 20° to 50° to the information surface.

12. A photosensor according to claim 11, wherein said bundle of optical fibers extends through said substrate from the one surface to another surface thereof at an inclination angle of 30° to 80° to the information surface.

13. A photosensor according to claims 1, 2, 3 or 4, wherein the one surface of said substrate having said light receiving window extends substantially in parallel to the information surface and said bundle of optical fibers extends through said substrate from the one surface to another surface thereof substantially perpendicular to the information surface.

14. A photosensor according to claim 13, wherein the one surface of said substrate having said light receiving window is a cutout portion and an optical guide member for guiding light is provided in the region of the cutout portion.

* * * * *